United States Patent
Muradore (10) Patent No.: US 10,216,005 B2
(45) Date of Patent: Feb. 26, 2019

(54) METHOD FOR OPTIMIZING A MEASURED CONTOUR OF A SPECTACLE FRAME

(71) Applicant: Essilor International, Charenton-le-Pont (FR)

(72) Inventor: Fabien Muradore, Charenton le Pont (FR)

(73) Assignee: Essilor International, Charenton-le-Pont (FR)

( * ) Notice: Subject to any disclaimer, the term of this patent is extended or adjusted under 35 U.S.C. 154(b) by 635 days.

(21) Appl. No.: 14/898,445

(22) PCT Filed: Jun. 13, 2014

(86) PCT No.: PCT/EP2014/062367
§ 371 (c)(1),
(2) Date: Dec. 14, 2015

(87) PCT Pub. No.: WO2014/198888
PCT Pub. Date: Dec. 18, 2014

(65) Prior Publication Data
US 2016/0139428 A1    May 19, 2016

(30) Foreign Application Priority Data

Jun. 13, 2013   (EP) .................................. 13305797.6

(51) Int. Cl.
*G02C 5/00*     (2006.01)
*G02C 7/02*     (2006.01)
*G02C 13/00*    (2006.01)
*G02C 7/06*     (2006.01)

(52) U.S. Cl.
CPC ............. *G02C 7/028* (2013.01); *G02C 7/024* (2013.01); *G02C 7/027* (2013.01); *G02C 7/066* (2013.01); *G02C 13/003* (2013.01); *G02C 13/005* (2013.01)

(58) Field of Classification Search
CPC ........ G02C 5/008; G02C 7/024; G02C 7/027; G02C 7/028; G02C 13/005; B24B 9/144

USPC ........................................ 351/159.74–159.76
See application file for complete search history.

(56) References Cited

U.S. PATENT DOCUMENTS

| 2010/0290002 A1* | 11/2010 | Dubois | ................ G02C 13/003 351/159.76 |
| 2011/0085132 A1* | 4/2011 | Dubois | .................. B24B 9/144 351/159.75 |
| 2012/0016644 A1* | 1/2012 | De Rossi | ................. G02C 7/02 703/2 |

FOREIGN PATENT DOCUMENTS

| EP | 2 028 529 | 2/2009 |
| EP | 2 031 435 | 3/2009 |
| EP | 2 305 424 | 4/2011 |
| WO | WO 00/52517 | 9/2000 |

OTHER PUBLICATIONS

C. Jiguo et al., "Estimating curves and derivatives with parametric penalized spline smoothing", Statistics and Computing, Kluwer Academic Publishers, vol. 22, No. 5, pp. 1573-1575, Sep. 23, 2011.

* cited by examiner

*Primary Examiner* — Darryl J Collins
(74) *Attorney, Agent, or Firm* — Oblon, McClelland, Maier & Neustadt, L.L.P.

(57) ABSTRACT

Method implemented by computer means for optimizing a measured contour of an opening of a spectacle frame, the method comprising: a contour data providing step, a working contour defining step, during which a working contour of the spectacle frame is defined, a first contour cost function providing step, during which a first contour cost function function of the mth derivative of the curve of the contour is provided, a set of contour cost functions providing step, during which a set of contour cost functions is provided, a global contour cost function evaluation step during which a global contour cost function is evaluated, a contour modifying step, during which the working contour is modified, wherein the global contour cost function evaluation and contour modifying steps are repeated so as to minimize the global contour cost function.

14 Claims, 3 Drawing Sheets

METHOD FOR OPTIMIZING A MEASURED CONTOUR OF A SPECTACLE FRAME

RELATED APPLICATIONS

This is a U.S. national stage application under 35 USC § 371 of International application No. PCT/EP2014/062367 filed on Jun. 13, 2014. This application claims the priority of European application no. 13305797.6 filed Jun. 13, 2013, the entire content of which is hereby incorporated by reference.

FIELD OF THE INVENTION

The invention relates to a method implemented by computer means for optimizing a measured contour of a spectacle frame.

BACKGROUND OF THE INVENTION

The discussion of the background of the invention herein is included to explain the context of the invention. This is not to be taken as an admission that any of the material referred to was published, known or part of the common general knowledge at the priority date of any of the claims.

Usually, a person needing to wear spectacles and having thus a prescription filled by an ophthalmologist goes to the premise of an optician for choosing the frame of the future spectacles. The future wearer of the spectacles may try several spectacle frames and finally chooses one of the tried frames. The optician orders a pair of lenses corresponding to the prescription. The lenses sent to the optician have been designed and manufactured according to optical criteria.

Depending on the service provided by the lens manufacturer, the optician may have to cut the lenses to the fit the spectacle frame the person has chosen or in case of "remote edging" service the optician receives the lenses already cut and only has to fit them in the spectacle frame.

The inner circumference of the openings of the chosen spectacle frame (e.g. the openings of the frame where ophthalmic lenses are intended to be mounted) can be measured very precisely by a measuring device, for example a mechanical sensor. More particularly, the openings of the frame include an inner groove and the characteristics of the groove (tilt angle with the openings, depth of the groove, etc.) can be measured by the mechanical sensor in a measuring room.

The measurements performed by the mechanical sensor on the chosen spectacle frame make it possible to order ophthalmic lenses which fit the chosen spectacle frame, on the one hand, and the wearer prescription, on the other hand.

According to the measurements performed by the mechanical sensor in the measuring room, the optician or the provider of ophthalmic lenses are able to: determine the best front surface of the lenses for the wearer according to optical criteria, for example the wearer prescription; edge and bevel the lenses to fit with the measurements performed on the chosen spectacle frame.

In the sense of the invention a step of cutting the lenses according to a spectacle frame shape is called "edging" and a step of forming a bevel on an external edged of the lens is called "beveling."

The lenses provider has to ensure that the provided lenses are adapted to the wearer prescription and to the chosen spectacle frame.

For example, the lenses provider has to ensure that the future lenses can effectively fit the chosen frame which may have particular openings and groove.

It will be thus understood that the measurements performed on the inner circumference openings of the chosen frame and the choice of the semi-finished lens are of great importance for the provider.

The mechanical sensor provides data in the form of a list of measured points. Matching a complex surface with a list of measured points may lead be complex or inaccurate.

SUMMARY OF THE INVENTION

Therefore, there is a need for a method for converting the measured points of the contour of the spectacle frame into a 3D smooth contour that may be used to be fitted by a complex surface, as a front optical surface of an optical lens.

A goal of the present invention is to provide such a method.

In accordance with a first aspect of the invention there is provided a method implemented by computer means for optimizing a measured contour of an opening of a spectacle frame, the method comprising:

- a contour data providing step, during which a contour data representing measured points of a contour of the spectacle frame is provided,
- a working contour defining step, during which a working contour of the spectacle frame is defined,
- a first contour cost function providing step, during which a first contour cost function is provided, the first contour cost function being a function of the mth derivative of the curve of at least a portion of the working contour with m an integer greater than or equal to 2,
- a set of contour cost functions providing step, during which a set of contour cost functions is provided, each contour cost function of the set of contour cost functions being a function of at least the deviation between the working contour and the measured points of the contour and the set of contour cost functions comprising at least one contour cost function,
- a global contour cost function evaluation step during which a global contour cost function is evaluated, the global contour cost function being a weighted sum of the first contour cost function and of each contour cost function of the set of contour cost functions,
- a contour modifying step, during which the working contour is modified, wherein the global contour cost function evaluation and contour modifying steps are repeated so as to minimize the global contour cost function.

Advantageously, the method according to an embodiment of the invention provides a smooth and accurate definition of the contour of a spectacle frame.

According to further embodiments which can be considered alone or in combination:

- m is smaller than or equal to 4; and/or
- the first contour cost function is a function of the mth derivative of the curve of the entire working contour; and/or
- in the global contour cost function the weight of the first contour cost function represents between 0.1% and 10% of the total weights; and/or
- the method further comprises a maximum deviation step during which a maximum deviation between the measured points of the contour and the optimized contour is defined and during the global contour cost function evaluation step the weight of the first cost function is adjusted so as to have the deviation between the measured points and the contour smaller than or equal to the maximum deviation.

The method further relates to a method implemented by computer means for optimizing at least one optical surface of an ophthalmic lens adapted to fit a spectacle frame, the method comprising:

an initial optical surface providing step, during which an initial optical surface is provided, a working optical surface defining step, during which a working optical surface is defined to be equal to at least a portion of the initial optical surface, a contour data determining step during which contour data representing a contour of an opening of the spectacle frame is determined according to a method of the invention, a first surface cost function providing step, during which a first surface cost function is provided, the first surface cost function being a function of the nth derivative of the surface of the working surface with n an integer greater than or equal to 2, a set of surface cost functions providing step, during which a set of surface cost functions is provided, each surface cost function of the set of surface cost functions being a function of at least one criterion over an evaluation zone of the working optical surface and the set of surface cost functions comprising at least one cost function, a global surface cost function evaluation step during which a global surface cost function is evaluated, the global surface cost function being a weighted sum of the first surface cost function and each surface cost function of the set of surface cost functions, a modifying step, during which the working surface is modified, wherein the evaluation and modifying steps are repeated so as to minimize the global surface cost function and
at least one of the surface cost functions of the set of surface cost functions is a function of the deviation between the contour of the spectacle frame and the surface of the ophthalmic lens.

According to further embodiments which can be considered alone or in combination:

the at least one criterion of each surface cost function of the set of surface cost functions is a surface criterion over at least a part of the evaluation zone; and/or the at least one criterion of each surface cost function of the set of surface cost functions is selected in the list consisting of: the minimum, maximum or mean sphere in at least one point of the evaluation zone, the mean sphere over the evaluation zone, the cylinder in at least one point of the evaluation zone, the mean cylinder over the evaluation zone, the altitude of at least one point of the evaluation zone, the mean altitude over the evaluation zone, the gradient of minimum, maximum, or mean sphere in at least one point of the evaluation zone, the second order derivation of the sphere in at least one point of the evaluation zone, the Gauss curvature in at least one point of the evaluation zone, the gradient of the Gauss curvature in at least one point of the evaluation, the minimal curvature in at least one point of the evaluation zone, the normal curvature in at least one point of the evaluation zone; and/or the evaluation zone of each surface cost function of the set of surface cost functions is selected in the lists consisting of: near vision zone, far vision zone, the intermediate corridor between the near and far vision zone, a peripheral rim, a nasal zone, and a temporal zone; and/or at least one of the criteria of one of the surface cost functions of the set of surface cost functions is related to the wearer's prescription; and/or n is smaller than or equal to 4; and/or in the global surface cost function the weight of the first surface cost function represents between 0.1% and 10% of the total weights.

According to a further aspect, the invention relates to a computer program product comprising one or more stored sequences of instructions that are accessible to a processor and which, when executed by the processor, causes the processor to carry out the steps of the method according to the invention.

Another aspect of the invention relates to a computer readable medium carrying one or more sequences of instructions of the computer program product according to an embodiment of the invention.

Another aspect of the invention relates to a program which makes a computer execute the method according to an embodiment of the invention.

Another aspect of the invention relates to a computer-readable storage medium having a program recorded thereon; where the program makes the computer execute the method according to an embodiment of the invention.

Another aspect of the invention relates to a device comprising a processor adapted to store one or more sequence of instructions and to carry out at least one of the steps of the method according to an embodiment of the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMS) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Non limiting embodiments of the invention will now be described with reference to the accompanying drawings in which.

DETAILED DESCRIPTION OF THE DRAWINGS

Elements in the figures are illustrated for simplicity and clarity and have not necessarily been drawn to scale. For example, the dimensions of some of the elements in the figure may be exaggerated relative to other elements to help improve the understanding of the embodiments of the present invention.

When an operator measures the contour of a spectacle frame, the contour data obtained corresponds to a list of points coordinates. Such list of coordinates may not be accurate enough to be used in the method according to the invention. Indeed, minimizing the cost function function of the deviation between the contour of the spectacle frame and the surface of the ophthalmic lens when the contour data are a list of points may be in conflict with providing a smooth surface, i.e. minimizing the first cost function.

Figure 1:
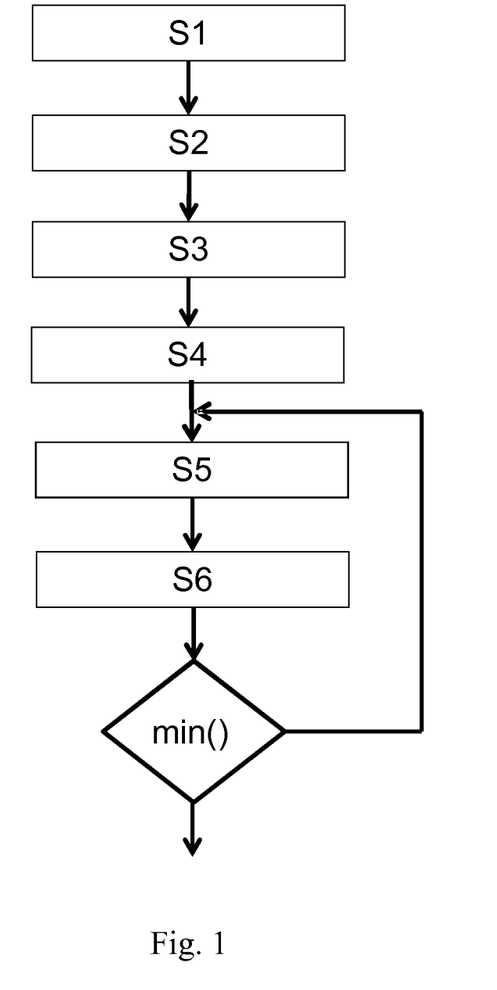
FIG. 1 is flowchart representing the steps of a method according to an embodiment of the invention.

Therefore, the invention proposes a method for optimizing a measured contour of a spectacle frame comprising:
a contour data providing step S1,
a working contour defining step S2,
a first contour cost function providing step S3,
a set of contour cost functions providing step S4,
a global contour cost function evaluation step S5, and
a contour modifying step S6, According to an embodiment of the invention the global contour cost function evaluation and contour modifying steps are repeated so as to minimize the global contour cost function.

The measured points of the contour are provided during the contour data providing step S1. Such measured points may be obtained using known measuring devices, for example using a mechanical sensor device.

During the working contour defining step S2, a working contour Cw is defined. For example, the working contour Cw may be obtained by joining each of the points of the contour data or by considering the mean value of the data points. According to an alternative embodiment, the working contour Cw may be obtained by considering a plurality of mean values of two or more consecutive data points.

A first contour cost function Jc1 is provided during the first contour cost function providing step S3. The first contour cost function Jc1 is function of the mth derivative of the curve of at least a portion, for example the entire, of the working contour Cw.

According to an embodiment of the invention, m is an integer greater than or equal to 2 and smaller than or equal to 4.

A set of contour cost functions (Jc2, Jc3, . . . Jck) are provided during the contour cost functions providing step S4, with k an integer greater than or equal to 2, i.e. the set of contour cost functions comprises at least one contour cost function.

Each contour cost functions of the set of contour cost functions is defined on part of the contour and is a function of at least the deviation between the working contour and part of the measured points of the contour. For example, each cost function is defined so as to be minimum when the deviation between the working contour and part of the measured points of the contour is minimum.

As an alternative embodiment, at least one, for example all, of the contour cost functions of the set of contour cost functions is defined on the whole contour.

A global contour cost function Gc is defined and evaluated during the global cost function evaluation step S5. The global contour cost function is a weighted sum of the first contour cost function Jc1 and of each of the contour cost function of the set of contour cost functions, i.e.

$$Gc = \sum_{i=1}^{k} \beta_i \times J_{ci}$$

with $\beta_i$ the weight of the ith contour cost function and $\sum_{i=1}^{k} \beta_i = 1$.

According to an embodiment, the weight $\beta_1$ of the first contour cost function is greater than or equal to 0.001 and smaller than or equal to 0.05

According to an embodiment of the invention, the method may further comprise a maximum deviation step during which a maximum deviation between the measured points of the contour and the optimized contour is defined and during the global contour cost function evaluation step the weight of the first cost function is adjusted so as to have the deviation between the measured points and the contour smaller than or equal to the maximum deviation.

The working contour is modified during the contour modifying step S6 and the global contour cost function Gc is reevaluated for the modified working contour Gc.

The contour modifying step S6 and the global contour cost function evaluation step S5 are repeated so as to obtain an optimized contour for which the global cost function Gc is minimum.

Advantageously, the obtained optimized contour has a smooth curvature, thanks to the first contour cost function Jc1 and is an accurate representation of the contour, thanks to the further contour cost functions (Jc2, Jc3, . . . , Jck).

Having a plurality of contour cost functions in the set of contour cost functions allows having different weights for different parts of the contour of the spectacle frame. One may want to give a greater weight to certain parts of the contour over others. This may be done by defining different contour cost functions and attributing different weights to each contour cost function.

According to an embodiment of the invention, the method may further comprise a maximum deviation step during which a maximum deviation between the measured points of the contour and the optimized contour is defined and during the global contour cost function evaluation step the weight of the first cost function is adjusted so as to have the deviation between the measured points and the contour smaller than or equal to the maximum deviation.

According to an embodiment of the invention, the optimized contour may be used to optimize a surface of an ophthalmic lens, for example the front surface of an ophthalmic lens adapted for a wearer.

In particular, the method according to the invention may be used to optimize the front surface of an optical lens so as to perfectly fit a selected spectacle frame.

According to such embodiment of the invention, the front face of the optical lens is the best compromise between the optical criteria defined over the surface of the ophthalmic lens, for example in the near, far and intermediate vision zones, and the shape of the spectacle frame selected by the wearer. Advantageously, the optical lens having such surface fits more easily and surely in the selected spectacle frame.

Figure 2:
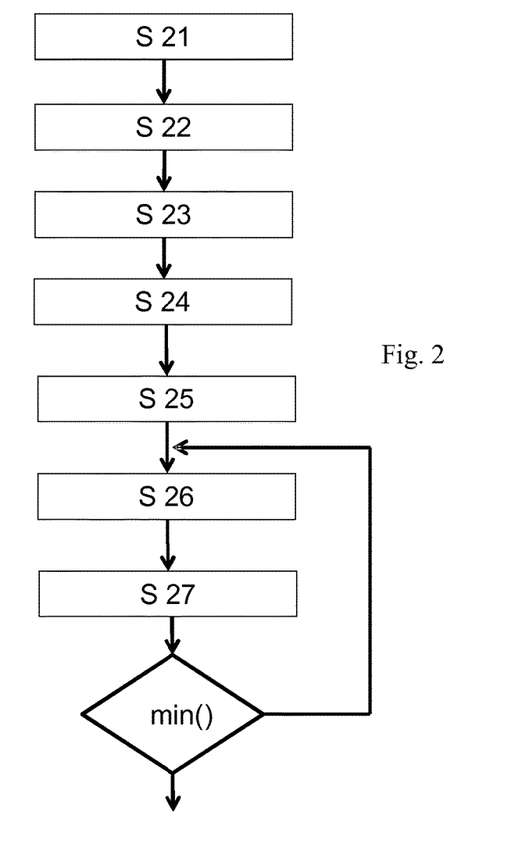
FIG. 2 is flowchart representing the steps of a method of optimizing an optical lens surface according to contour data optimized by a method of the invention.

As illustrated on FIG. 2, the method for optimizing at least one optical surface of an optical lens according to the invention comprises:
    an initial optical surface providing step S21,
    a working optical surface defining step S22,
    a contour data determining step S23,
    a first surface cost function providing step S24,
    a set of surface cost functions providing step S25,
    a global surface cost function evaluation step S26, and
    a modifying step S27.

The evaluation and modifying steps are repeated so as to minimize the global surface cost function as evaluated in the global surface cost function evaluation step S25.

During the initial optical surface providing step S21, an initial optical surface IS to be optimized is provided. The initial optical surface may be a spherical surface or a more complex surface, such as a progressive addition surface.

A working surface WS is defined during the working optical surface defining step S22. The working optical surface WS is initially defined as equal to the initial optical surface IS.

According to an alternative embodiment, the working optical surface WS is initially defined as equal to a portion of the initial optical surface IS.

Contour data representing the contour of the spectacle frame is determined during the contour data determining step S23. The contour is measured using a measuring device, for example a mechanical sensor and the contour data is determined by using a method according to the invention.

A first surface cost function J1 is provided during the first surface cost function providing step S24. The first surface cost function J1 is a function of the nth derivative of the working surface WS with n an integer greater than or equal to 2. According to an embodiment of the invention n is smaller than or equal to 4.

According to a preferred embodiment of the invention, the first surface cost function is directly proportional to the nth derivative of the working surface WS. In other words, the first cost function J1 is minimal when the nth derivative of the working surface is minimal.

A set of surface cost functions J2, J3, . . . , Jp is provided during the set of surface cost functions providing step S25, p being an integer greater than or equal to 2, i.e. the set of surface cost functions comprises at least one cost function.

Each surface cost function of the set of surface cost functions is a function of at least one criterion over an evaluation zone of the working optical surface.

According to an embodiment of the invention, at least one evaluation zone is defined on the initial surface and a cost function is associated to the evaluation zone. The cost function is a function of the value of at least one criterion of the evaluation zone.

The evaluation zone may be of any type and have any shape. For example the evaluation zone may be a peripheral rim, in particular the rim of a selected spectacle frame intended to be used with the ophthalmic lens.

The evaluation zone may further be a nasal zone or a temporal zone of the optical lens.

So as to assure a perfect fit of the optimized optical surface with the spectacle frame, at least one of the surface cost functions is function of the deviation between the contour of the spectacle frame and the surface of the ophthalmic lens.

The deviation between the contour of the spectacle frame and the surface of the ophthalmic lens may be defined by considering the difference of the Z coordinate between each contour point (X,Y,Z) of a set of points of the contour of the spectacle frame and the corresponding surface point (X,Y,Z') of the surface of the ophthalmic lens at the same coordinates (X,Y).

The deviation between the contour of the spectacle frame and the surface of the ophthalmic lens may be defined by considering the difference of coordinates between each contour point of a set of points of the contour and the surface point of the surface for which the normal to the surface at said surface point intersects said contour point. The deviation between the contour of the spectacle frame and the surface of the ophthalmic lens may be defined as the sum, the maximum, or the mean value of the differences between each point of the set of points of the contour and the surface as defined previously.

The skilled person may consider any other known way to define the deviation between the contour of the spectacle frame and the surface of the ophthalmic lens.

When the optical surface to be optimized is an optical surface of a progressive addition lens, some evaluation zones may be selected in the near vision zone, and/or the far vision zone, and/or an intermediate corridor between the near and far vision zones. The far vision zone corresponds to a zone around the far vision point and the near vision zone corresponds to a zone around the near vision point.

Progressive lenses comprise micro-markings that have been made mandatory by a harmonized standard ISO 8990-2. Temporary markings may also be applied on the surface of the lens, indicating diopter measurement positions (sometimes referred to as control points) on the lens, such as for far vision and for near vision, a prism reference point and a fitting cross for instance, as represented on FIG. 3. It should be understood that what is referred to herein by the terms far vision point and near vision point can be any one of the points included in the orthogonal projection on the first surface of the lens, of respectively the FV and NV temporary markings provided by the lens manufacturer. If the temporary markings are absent or have been erased, it is always possible for a skilled person to position such control points on the lens by using a mounting chart and the permanent micro-markings.

The criteria of each of the cost function Ji of the set of cost functions may be a surface criterion at a given point of the evaluation zone or over part, for example all, of the evaluation zone.

For example, the surface criterion may be selected among the list consisting of: the sphere in at least one point of the evaluation zone, the mean sphere over the evaluation zone, the cylinder in at least one point of the evaluation zone, the mean cylinder over the evaluation zone, the altitude of at least one point of the evaluation zone, the mean altitude over the evaluation zone, the gradient of sphere in at least one point of the evaluation zone, gradient of cylinder in at least one point of the evaluation zone, the second order derivation of the sphere in at least one point of the evaluation zone, the second order derivation of the cylinder in at least one point of the evaluation zone.

As is known, a minimum curvature $CURV_{min}$ is defined at any point on an aspherical surface by the formula:

$$CURV_{min} = \frac{1}{R_{max}}$$

where $R_{max}$ is the local maximum radius of curvature, expressed in meters and $CURV_{min}$ is expressed in dioptres.

Similarly, a maximum curvature $CURV_{max}$ can be defined at any point on an aspheric surface by the formula:

$$CURV_{max} = \frac{1}{R_{min}}$$

where $R_{min}$ is the local minimum radius of curvature, expressed in meters and $CURV_{max}$ is expressed in dioptres.

It can be noticed that when the surface is locally spherical, the local minimum radius of curvature $R_{min}$ and the local maximum radius of curvature $R_{max}$ are the same and, accordingly, the minimum and maximum curvatures $CURV_{min}$ and $CURV_{max}$ are also identical. When the surface is aspherical, the local minimum radius of curvature $R_{min}$ and the local maximum radius of curvature $R_{max}$ are different.

From these expressions of the minimum and maximum curvatures $CURV_{min}$ and $CURV_{max}$, the minimum and maximum spheres labeled $SPH_{min}$ and $SPH_{max}$ can be deduced according to the kind of surface considered.

When the surface considered is the object side surface (also referred to as the front surface), the expressions are the following:

$SPH_{min} =$ $$(n-1)*CURV_{min} = \frac{n-1}{R_{max}} \text{ and } SPH_{max} = (n-1)*CURV_{max} = \frac{n-1}{R_{min}}$$

where n is the index of the constituent material of the lens.

If the surface considered is an eyeball side surface (also referred to as the back surface), the expressions are the following:

$SPH_{min} =$ $$(1-n)*CURV_{min} = \frac{1-n}{R_{max}} \text{ and } SPH_{max} = (1-n)*CURV_{max} = \frac{1-n}{R_{min}}$$

where n is the index of the constituent material of the lens.

As is well known, a mean sphere $SPH_{mean}$ at any point on an aspherical surface can also be defined by the formula:

$$SPH_{mean} = \frac{1}{2}(SPH_{min}+SPH_{max})$$

The expression of the mean sphere therefore depends on the surface considered:
if the surface is the object side surface, $$SPH_{mean} = \frac{n-1}{2}\left(\frac{1}{R_{min}} + \frac{1}{R_{max}}\right)$$

if the surface is an eyeball side surface, $$SPH_{mean} = \frac{1-n}{2}\left(\frac{1}{R_{min}} + \frac{1}{R_{max}}\right)$$

A cylinder CYL is also defined by the formula $CYL=|SPH_{max}-SPH_{min}|$.

The characteristics of any aspherical face of the lens may be expressed by the local mean spheres and cylinders. A surface can be considered as locally aspherical when the cylinder is at least 0.25 diopters.

For an aspherical surface, a local cylinder axis $\gamma_{AX}$ may further be defined.

The cylinder axis $\gamma_{AX}$ is the angle of the orientation of the maximum curvature $CURV_{max}$ with relation to a reference axis and in the chosen sense of rotation. In the above defined convention, the reference axis is horizontal (the angle of this reference axis is 0°) and the sense of rotation is counter-clockwise for each eye, when looking at the wearer ($0° \leq \gamma_{AX} \leq 180°$). An axis value for the cylinder axis $\gamma_{AX}$ of +45° therefore represents an axis oriented obliquely, which when looking at the wearer, extends from the quadrant located up on the right to the quadrant located down on the left.

According to a preferred embodiment of the invention, the optical lens is an ophthalmic lens adapted for a wearer and at least one of the criteria of one of the surface cost functions of the set of surface cost functions is related to the wearer's prescription.

Furthermore, a progressive multifocal lens may also be defined by optical characteristics, taking into consideration the situation of the person wearing the lenses. Thus the criteria of the cost functions may be optical criteria.

Figure 4:
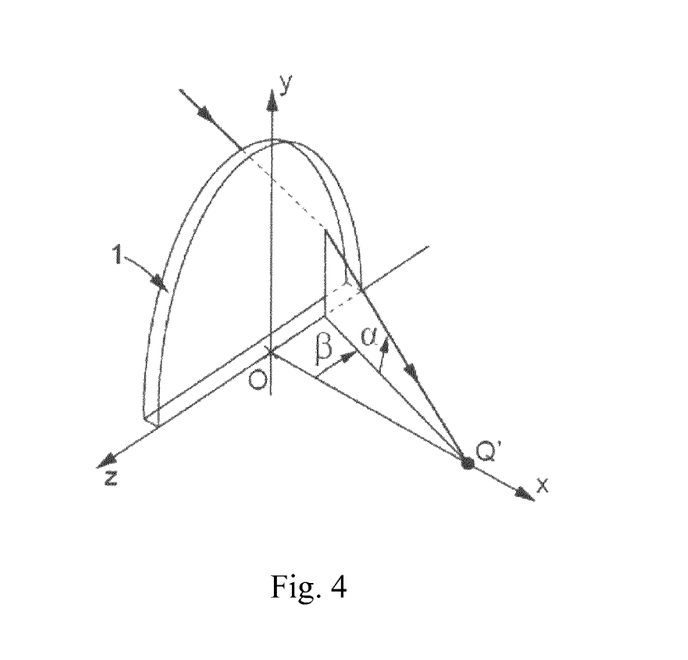
FIGS. 4 and 5 show, diagrammatically, optical systems of eye and lens.
Figure 5:
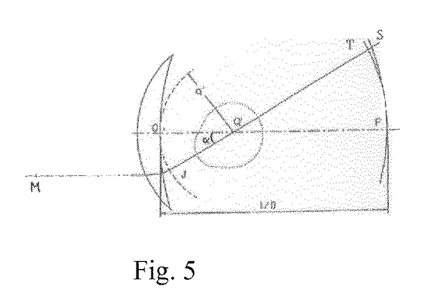

FIGS. 4 and 5 are diagrammatic illustrations of optical systems of eye and lens, thus showing the definitions used in the description. More precisely, FIG. 4 represents a perspective view of such a system illustrating parameters α and β used to define a gaze direction. FIG. 5 is a view in the vertical plane parallel to the antero-posterior axis of the wearer's head and passing through the center of rotation of the eye in the case when the parameter β is equal to 0.

The center of rotation of the eye is labeled Q'. The axis Q'F', shown on FIG. 5 in a dot-dash line, is the horizontal axis passing through the center of rotation of the eye and extending in front of the wearer—that is the axis Q'F' corresponding to the primary gaze view. This axis cuts the aspherical surface of the lens on a point called the fitting cross, which is present on lenses to enable the positioning of lenses in a frame by an optician. The point of intersection of the rear surface of the lens and the axis Q'F' is the point O. O can be the fitting cross if it is located on the rear surface. An apex sphere, of center Q', and of radius q', is tangential to the rear surface of the lens in a point of the horizontal axis. As examples, a value of radius q' of 25.5 mm corresponds to a usual value and provides satisfying results when wearing the lenses.

Figure 3:
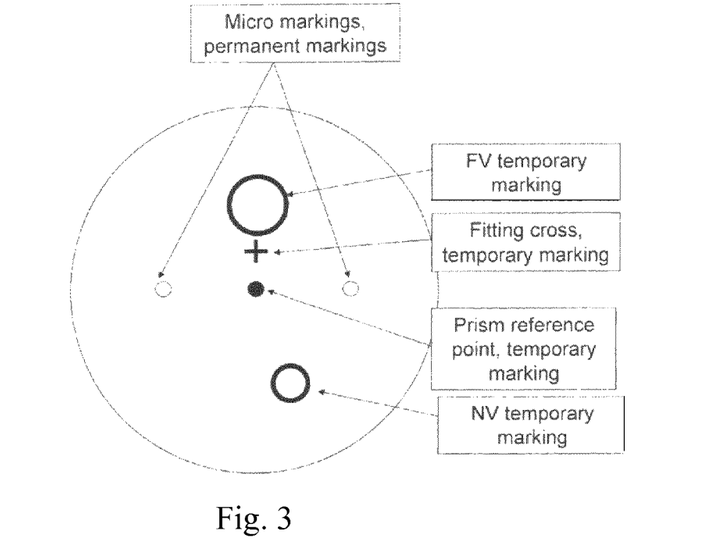
FIG. 3 shows a lens bearing temporary markings applied by the lens manufacturer.

A given gaze direction—represented by a solid line on FIG. 3—corresponds to a position of the eye in rotation around Q' and to a point J of the apex sphere; the angle β is the angle formed between the axis Q'F' and the projection of the straight line Q'J on the horizontal plane comprising the axis Q'F'; this angle appears on the scheme on FIG. 4. The angle α is the angle formed between the axis Q'J and the projection of the straight line Q'J on the horizontal plane comprising the axis Q'F'; this angle appears on the scheme on FIGS. 4 and 5. A given gaze view thus corresponds to a point J of the apex sphere or to a couple (α,β). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

Ergorama is a function associating to each gaze direction the usual distance of an object point. Typically, in far vision following the primary gaze direction, the object point is at infinity. In near vision, following a gaze direction essentially corresponding to an angle α of the order of 35° and to an angle β of the order of 5° in absolute value toward the nasal side, the object distance is of the order of 30 to 50 cm. For more details concerning a possible definition of an ergorama, U.S. Pat. No. 6,318,859 may be considered. This document describes an ergorama, its definition and its modeling method. For a method of the invention, points may be at infinity or not. Ergorama may be a function of the wearer's ametropia.

Using these elements, it is possible to define a wearer optical power and astigmatism, in each gaze direction. An object point M at an object distance given by the ergorama is considered for a gaze direction (a,b). An object proximity ProxO is defined for the point M on the corresponding light ray in the object space as the inverse of the distance MJ between point M and point J of the apex sphere:

$$ProxO = 1/MJ$$

This enables to calculate the object proximity within a thin lens approximation for all points of the apex sphere, which is used for the determination of the ergorama. For a real lens, the object proximity can be considered as the inverse of the distance between the object point and the front surface of the lens, on the corresponding light ray.

For the same gaze direction (α,β), the image of a point M having a given object proximity is formed between two points S and T which correspond respectively to minimal and maximal focal distances (which would be sagittal and tangential focal distances). The quantity ProxI is called image proximity of the point M:

$$ProxI = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an optical power Pui as the sum of the image proximity and the object proximity.

$$Pui = ProxO + ProxI$$

With the same notations, an astigmatism Ast is defined for every gaze direction and for a given object proximity as:

$$Ast = \left|\frac{1}{JT} - \frac{1}{JS}\right|$$

This definition corresponds to the astigmatism of a ray beam created by the lens. It can be noticed that the definition gives, in the primary gaze direction, the classical value of astigmatism. The astigmatism angle, usually called axis, is the angle γ. The angle γ is measured in the frame $\{Q', x_m, y_m, z_m\}$ linked to the eye. It corresponds to the angle with which the image S or T is formed depending on the convention used with relation to the direction $z_m$ in the plane $\{Q', z_m, y_m\}$.

Possible definitions of the optical power and the astigmatism of the lens, in the wearing conditions, can thus be calculated as explained in the article by B. Bourdoncle et al., entitled "Ray tracing through progressive ophthalmic lenses", 1990 International Lens Design Conference, D. T. Moore ed., Proc. Soc. Photo. Opt. Instrum. Eng. Standard wearing conditions are to be understood as the position of the lens with relation to the eye of a standard wearer, notably defined by a pantoscopic angle of −8°, a lens-pupil distance of 12 mm, a pupil-eye rotation center of 13.5 mm and a wrap angle of 0°. The pantoscopic angle is the angle in the vertical plane between the optical axis of the spectacle lens and the visual axis of the eye in the primary position, usually taken to be the horizontal. The wrap angle is the angle in the horizontal plane between the optical axis of the spectacle lens and the visual axis of the eye in the primary position, usually taken to be the horizontal. Other conditions may be used. Wearing conditions may be calculated from a ray-tracing program, for a given lens. Further, the optical power and the astigmatism may be calculated so that the prescription is either fulfilled at the reference points (i.e control points in far vision) and for a wearer wearing his spectacles in the wearing conditions or measured by a frontofocometer.

Figure 6:
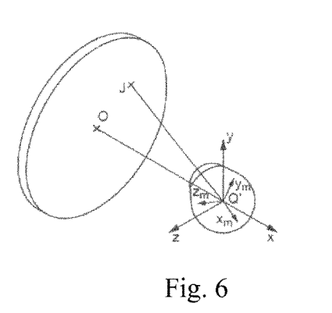
FIG. 6 shows a ray tracing from the center of rotation of the eye.

FIG. 6 represents a perspective view of a configuration wherein the parameters α and β are non zero. The effect of rotation of the eye can thus be illustrated by showing a fixed frame $\{x, y, z\}$ and a frame $\{x_m, y_m, z_m\}$ linked to the eye. Frame $\{x, y, z\}$ has its origin at the point Q'. The axis x is the axis Q'O and it is oriented from the lens toward the eye. The y axis is vertical and oriented upwardly. The z axis is such that the frame $\{x, y, z\}$ be orthonormal and direct. The frame $\{x_m, y_m, z_m\}$ is linked to the eye and its center is the point Q'. The $x_m$ axis corresponds to the gaze direction JQ'. Thus, for a primary gaze direction, the two frames $\{x, y, z\}$ and $\{x_m, y_m, z_m\}$ are the same. It is known that the properties for a lens may be expressed in several different ways and notably in surface and optically. A surface characterization is thus equivalent to an optical characterization. In the case of a blank, only a surface characterization may be used. It has to be understood that an optical characterization requires that the lens has been machined to the wearer's prescription. In contrast, in the case of an ophthalmic lens, the characterization may be of a surface or optical kind, both characterizations enabling to describe the same object from two different points of view. Whenever the characterization of the lens is of optical kind, it refers to the ergorama-eye-lens system described above. For simplicity, the term 'lens' is used in the description but it has to be understood as the 'ergorama-eye-lens system'. The value in surface terms can be expressed with relation to points.

The values in optic terms can be expressed for gaze directions. Gaze directions are usually given by their degree of lowering and azimuth in a frame whose origin is the center of rotation of the eye. When the lens is mounted in front of the eye, a point called the fitting cross is placed before the pupil or before the eye rotation center Q' of the eye for a primary gaze direction. The primary gaze direction corresponds to the situation where a wearer is looking straight ahead. In the chosen frame, the fitting cross corresponds thus to a lowering angle α of 0° and an azimuth angle β of 0° whatever surface of the lens the fitting cross is positioned—rear surface or front surface.

The above description made with reference to FIGS. 4 to 6 was given for central vision. In peripheral vision, as the gaze direction is fixed, the center of the pupil is considered instead of center of rotation of the eye and peripheral ray directions are considered instead of gaze directions. When peripheral vision is considered, angle α and angle β correspond to ray directions instead of gaze directions.

A global cost function is defined and evaluated during the global cost function evaluation step S26.

The global cost function G is a weighted sum of the first surface cost function and the each surface cost function of the set of cost functions, i.e.

$$G = \Sigma_{i=1}^{P} \alpha_i \times J_i$$

with $\alpha_i$ the weight of the ith cost function and $\Sigma_{i=1}^{P} \alpha_i = 1$.

According to an embodiment of the invention, the weight $\alpha_1$ of the first cost function is comprised between 0.001 and 0.05.

During the modifying step S27, the working surface WS is modified and the global cost function is revaluated for the modified working contour.

The evaluation and modifying steps are repeated so as to minimize the global cost function. The working surface WS having the smallest global cost function is the best compromised between the criteria over the evaluation zones, the overall smoothness of the optical surface and the contour of the spectacle frame. Therefore an ophthalmic lens having a front surface corresponding to such surface perfectly fits the spectacle frame.

The invention has been described above with the aid of embodiments without limitation of the general inventive concept.

In particular, although the method for optimizing at least one optical surface of an optical lens has been described starting from an initial optical surface, the method may be implemented without starting from an initial optical surface.

According to such embodiment, the method for optimizing at least one optical surface of an optical lens comprises:
  an optical surface parameter providing step, during which at least one parameter that defines the optical surface to be determined is provided,
  a contour data determining step, during which contour data representing a contour of the spectacle frame is determined according to a method of the invention,
  a first surface cost function providing step, during which a first surface cost function is provided, the first surface cost function being a function of the nth derivative of the surface defined by the at least one parameter with n an integer greater than or equal to 2,
  a set of surface cost functions providing step, during which a set of surface cost functions is provided, each surface cost function of the set of surface cost functions being a function of at least one criterion over an evaluation zone of the surface defined by the at least one parameter and the set of surface cost functions comprising at least one cost function,
  an optical surface parameter determining step, during which the value of the at least one optical surface parameter that minimizes a global surface cost function is determined, the global surface cost function being a weighted sum of the first surface cost function and each surface cost function of the set of surface cost functions, at least one of the surface cost function being function of the deviation between the contour of the spectacle frame and the surface of the ophthalmic lens.

While in the embodiments described in detail the optical surface to be optimized is the front surface of an ophthalmic lens, it will be understood, that in alternative embodiments of the invention the optical surface to optimize may be the back surface of the ophthalmic lens.

Furthermore, while in the embodiments described it is suggested that the back surface of the optical lens is formed by a machining process, it will be understood, that in alternative embodiments of the invention both or either surfaces of the lens may be formed by a machining process.

Moreover, although the surface to be optimized is represented as concave, it will be appreciated that this surface could equally well be convex or any other curved surface.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method implemented by computer means for optimizing a measured contour of an opening of a spectacle frame, the method comprising:
   a contour data providing step (S1), during which a contour data representing measured points of a contour of the spectacle frame is provided,
   a working contour defining step (S2), during which a working contour of the spectacle frame is defined,
   a first contour cost function providing step (S3), during which a first contour cost function is provided, the first contour cost function being a function of the mth derivative of the curve of at least a portion of the working contour with m an integer greater than or equal to 2,
   a set of contour cost functions providing step (S4), during which a set of contour cost functions is provided, each contour cost function of the set of contour cost functions being a function of at least the deviation between the working contour and the measured points of the contour and the set of contour cost functions comprising at least one contour cost function,
   a global contour cost function evaluation step (S5), during which a global contour cost function is evaluated, the global contour cost function being a weighted sum of the first contour cost function and of each contour cost function of the set of contour cost functions,
   a contour modifying step (S6), during which the working contour is modified,
   wherein the global contour cost function evaluation and contour modifying steps are repeated so as to minimize the global contour cost function.

2. The method according to claim 1, wherein m is smaller than or equal to 4.

3. The method according to claim 1, wherein the first contour cost function is a function of the mth derivative of the curve of the entire working contour.

4. The method according to claim 1, wherein in the global contour cost function the weight of the first contour cost function represents between 0.1% and 5% of the total weights.

5. The method according to claim 1, wherein the method further comprises a maximum deviation step during which a maximum deviation between the measured points of the contour and the optimized contour is defined and during the global contour cost function evaluation step the weight of the first cost function is adjusted so as to have the deviation between the measured points and the contour smaller than or equal to the maximum deviation.

6. A method implemented by computer means for optimizing at least one optical surface of an ophthalmic lens adapted to fit a spectacle frame, the method comprising:
- an initial optical surface providing step (S21), during which an initial optical surface is provided,
- a working optical surface defining step (S22), during which a working optical surface is defined to be equal to at least a portion of the initial optical surface,
- a contour data determining step (S23), during which contour data representing a contour of an opening of the spectacle frame is determined according to a method of claim 1,
- a first surface cost function providing step (S24), during which a first surface cost function is provided, the first surface cost function being a function of the nth derivative of the surface of the working surface with n an integer greater than or equal to 2,
- a set of surface cost functions providing step (S25), during which a set of surface cost functions is provided, each surface cost function of the set of surface cost functions being a function of at least one criterion over an evaluation zone of the working optical surface and the set of surface cost functions comprising at least one cost function,
- a global surface cost function evaluation step (S26), during which a global surface cost function is evaluated, the global surface cost function being a weighted sum of the first surface cost function and each surface cost function of the set of surface cost functions,
- a modifying step (S27), during which the working surface is modified,
  wherein the evaluation and modifying steps are repeated so as to minimize the global surface cost function and
  at least one of the surface cost functions of the set of surface cost functions is function of the deviation between the contour of the spectacle frame and the surface of the ophthalmic lens.

7. The method according to claim 6, wherein the at least one criterion of each surface cost function of the set of surface cost functions is a surface criterion over at least part of the evaluation zone.

8. The method according to claim 7, wherein the at least one criterion of each surface cost function of the set of surface cost functions is selected in the list consisting of: the minimum, maximum or mean sphere in at least one point of the evaluation zone, the mean sphere over the evaluation zone, the cylinder in at least one point of the evaluation zone, the mean cylinder over the evaluation zone, the altitude of at least one point of the evaluation zone, the mean altitude over the evaluation zone, the gradient of minimum, maximum, or mean sphere in at least one point of the evaluation zone, the second order derivation of the sphere in at least one point of the evaluation zone, the Gauss curvature in at least one point of the evaluation zone, the gradient of the Gauss curvature in at least one point of the evaluation, the minimal curvature in at least one point of the evaluation zone, the normal curvature in at least one point of the evaluation zone.

9. The method according to claim 6, wherein the evaluation zone of each surface cost function of the set of surface cost functions is selected in the lists consisting of: near vision zone, far vision zone, the intermediate corridor between the near and far vision zone, a peripheral rim, a nasal zone, and a temporal zone.

10. The method according to claim 6, wherein at least one of the criteria of one of the surface cost functions of the set of surface cost functions is related to the wearer's prescription.

11. The method according to claim 6, wherein n is smaller than or equal to 4.

12. The method according to claim 6, wherein in the global surface cost function the weight of the first surface cost function represents between 0.1% and 10% of the total weights.

13. A computer program product comprising one or more stored sequences of instructions that are accessible to a processor and which, when executed by the processor, causes the processor to carry out the steps of claims 1.

14. A computer readable medium carrying one or more sequences of instructions of the computer program product of claim 13.

* * * * *